Figure 1:
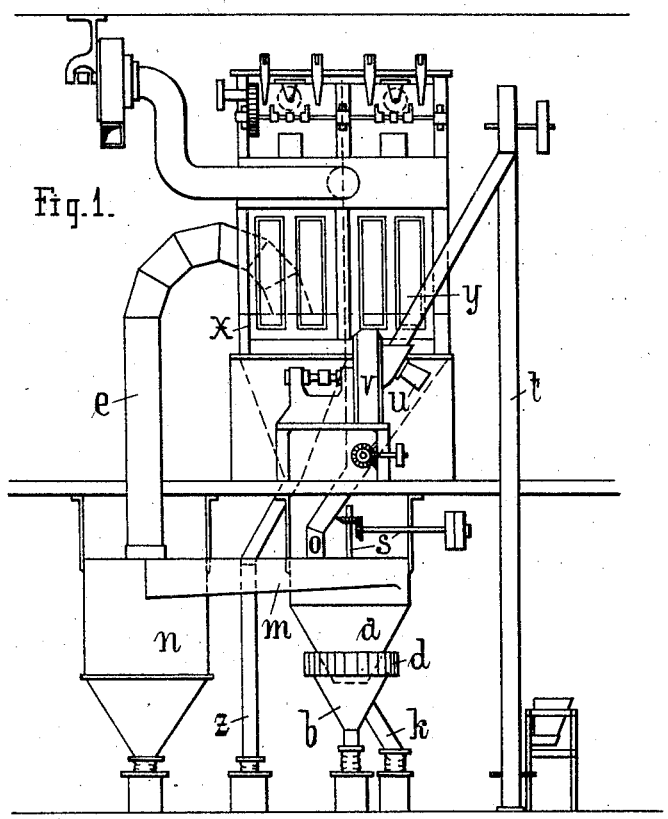

E. L. H. BAUERMEISTER.
APPARATUS FOR SEPARATING GROUND MATERIAL, PARTICULARLY COCOA POWDER.
APPLICATION FILED DEC. 9, 1912.

1,058,344.

Patented Apr. 8, 1913.

2 SHEETS—SHEET 1.

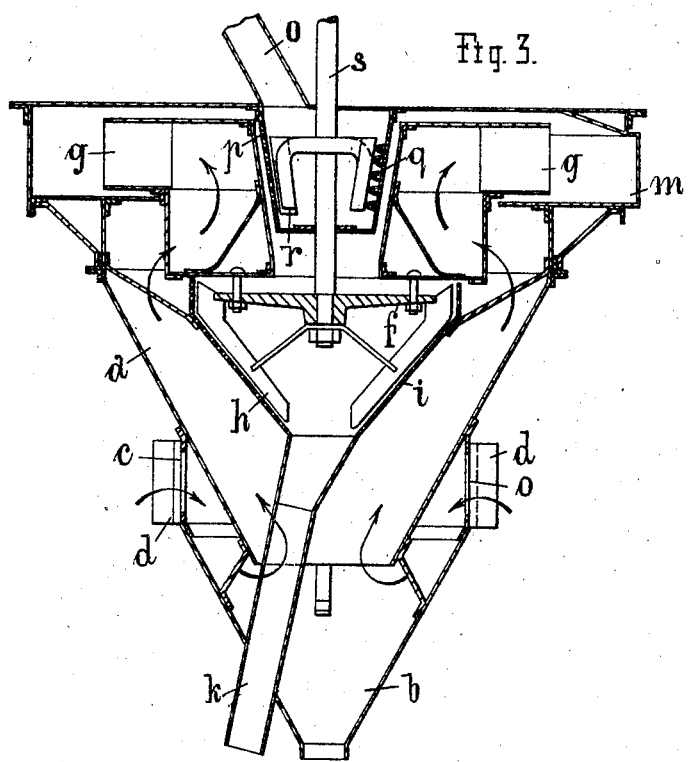
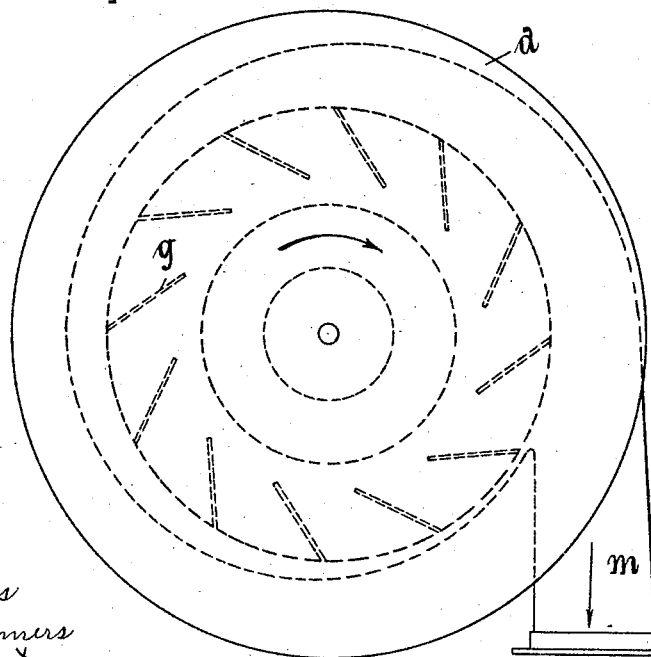

UNITED STATES PATENT OFFICE.

EMIL LUDWIG HERMANN BAUERMEISTER, OF ALTONA, GERMANY.

APPARATUS FOR SEPARATING GROUND MATERIAL, PARTICULARLY COCOA POWDER.

1,058,344.   Specification of Letters Patent.   Patented Apr. 8, 1913.

Application filed December 9, 1912. Serial No. 735,824.

*To all whom it may concern:*

Be it known that I, EMIL LUDWIG HERMANN BAUERMEISTER, a resident of Altona, near Hamburg, Germany, and subject of the German Emperor, have invented a new and useful Apparatus for Separating Ground Material, Particularly Cocoa Powder, of which the following is a specification.

The present invention relates to an apparatus for separating or sifting ground material particularly cocoa powder and similar products, adapted especially for use in connection with a blast sifting machine having a ventilator or an exhauster and a spreading disk in combination with a dust collector.

During the last few years in the cocoa industry cocoa has been freed of more of its oil and fat than formerly, and at the same time it has been the aim to reduce the size of the particles of the cocoa powder as much as possible. Cocoa powder deprived of its oil will not retain its solubility and power of suspension equal to cocoa, not so strongly deprived of oil unless the former is sifted to a finer degree. Though by the aid of sifting apparatus in which very fine sieve gauze is used any desired degree of fineness can be obtained, yet the application of such fine sieves considerably decreases the efficiency quantitatively. Moreover the meshes of the sieves or wire netting become obstructed or smeared on account of the fatty constituents and therefore the sieves have to be renewed several times a day. Therefore it might appear obvious to make use of blast sifting for separating or sifting cocoa, it having given good results in connection with other products.

All blast sifting apparatus known heretofore are not adapted to sift cocoa and have the following drawbacks: In the blast sifters known heretofore the current of air continues to circulate within the sifter in a circle and fresh air is fed to a very little extent, if at all, into the sifter. This constant use of the same circulating current has the drawback that the temperature gradually increases, particularly when cocoa powder is treated. It may even happen, that the temperature rises to such an extent, that the melting point of cocoa butter is reached. The consequence is, that the cocoa powder forms balls or lumps and thus impairs or completely destroys the efficiency. The blast sifter must then be stopped for a while and can only be brought into action again after being cleaned and cooled. The feeding of the materials to be sifted, to the blast sifter takes place either directly from the pulverizing machine or by aid of an elevator, spiral screws or other conveying devices. By these means however it is not possible to obtain an even and uniform feed of the material. The material is rather fed on to the blast sifter more or less intermittently. In blast sifters in which a spreading—or distributing—disk is used, the material is not thrown off evenly, but it leaves the spreading disk in the form of an uneven thick horizontal veil which must be crossed by the current of air. The consequence is, that on those places, where the current of air strikes against the thicker parts of the veil the material falls down in a thicker stream than on other places where the veil or mantle of material flung against a dashring is crossed by the stream of air. On those places, where the material falls down in the thicker stream the current of air cannot separate the finer particles to a sufficient degree, while on those places where the stream of material is thin or weak the current of air will act to a stronger degree. The irregularity of the veil or mantle of this sifted material is the cause of the fine product still containing coarse or coarser particles while the coarse products contain fine powdery substances. In blast sifters in which the spreading disk or plate throws the material against a full dashring the ground products containing fat (such as cocoa powder) frequently adhere or stick very soon to the surface of the dashring on account of the fatty constituents in the material. The stream of air naturally would have no effect on this sticking, adhering material which would finally fall off in larger or smaller lumps. The consequence would be again, that the blast sifter must be thrown out of action and that the dashring would have to be cleaned. Moreover the blast sifters known heretofore are not adapted to expel from the cocoa powder the fine woolly hairs, which become detached from the press covers or flannels in producing presscakes. These hairs adhere to presscakes and when the latter are ground hairs are found in the ground material. In closely examining such a presscake it is found that the surface is covered with fine short hairs. The specific weight of these hairs is still less than the specific weight of the finest particles of cocoa and then the blast sifter merely carries out a separation according to the weight. These fine hairs will be found in the finely sifted product. Had these hairs been evenly distributed throughout the whole quantity of the sifted cocoa powder this unpleasant fact in many cases would not be noticed. However there is the further inconvenience that in using blast sifters these fine hairs always accumulate on certain places and then adhering to small lumps fall within the cocoa meal. If cocoa meal which is merely produced by the aid of blast sifters is examined microscopically or if the cocoa powder is sifted subsequently through a fine sieve the hairs will be readily found in the meal. The removal of the hairs from the cocoa meal is an absolute necessity to meet all demands with regard to the quality and purity.

The drawbacks explained above are done away with by the present invention, which more particularly refers to the separation of cocoa powder. According to this invention a blast sifting machine having a ventilator and spreading plate is combined with a dust collecting device operating in such a manner, that the material, after being led through a distributing cage is driven by means of spreading disks through sieves into a vessel serving as a depositor or collector for the gritty constituents, the fed material being passed by a current of fresh air, which moves upward and which may be produced by the ventilator and regulated with regard to its volume so that it is continuously renewed in such manner that this current of air carries away the dust or powder of the ground product. The current of air thus being saturated with cocoa dust or meal is led into a dust depository or collector, in which it is deprived of the dust and from where it finally escapes into the open air in a clean state.

In the accompanying drawings an apparatus is shown, for carrying out this invention by way of example.

Figure 2:
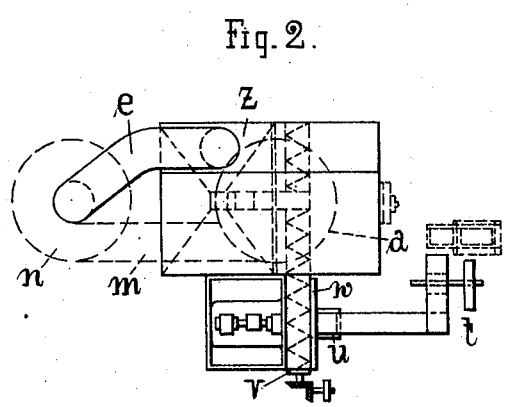

Figure 1 is an elevation of a complete sifting apparatus embodying my invention. Fig. 2 is a plan of the lower part of the apparatus. Fig. 3 is an elevational section of the blast sifter arranged according to the present invention to a larger scale and Fig. 4 is a plan of the sifter shown in Fig. 3.

The blast sifter consists of a partly cylindrical and partly conical vessel or chamber $a$ from which is suspended a collecting cone $b$, the upper part of which is preferably cylindrical and is provided with a number of openings $c$ for allowing fresh air to enter. These openings may be provided with valves or adjustable flaps $d$ similar to Venetian blinds to regulate the entrance of air and thus the strength of the current of air created by the ventilator or exhauster $g$. Centrally within the chamber $a$ a spreading disk $f$ is rotatably arranged and above this disk the ventilator and exhauster $g$ is mounted, firmly connected with the spreading disk so as to rotate with it. The disk $f$ is provided on its underside with a number of beating blades or beating wings $h$, which are surrounded by a preferably conical sieve mantle $i$ having an outlet spout $k$. This mantle is prolonged upward so as to also surround the rotating disk $f$. The material falling on the disk $f$ is spread about in the shape of a thin veil or mantle, striking against the upper part of the sieve $i$, and in falling or sliding along the inner surface of the sieve, the material is distributed over the complete surface of the sieve by the beating wings and driven through the meshes of the sieves and thus blasted into the chamber $a$. The material entering the space between the sieve $i$ and the conical wall of the chamber $a$ and consisting of cocoa meal and grit is passed or crossed by an upward current of fresh air, taking the way indicated by arrows in Fig. 3. The upward moving air will be saturated with the finest particles of the material (meal dust) while the coarser part (grit) falls downward and is led away through the outlet of the collecting cone $b$. The meshing of the sieve mantle $i$ should be so chosen that it allows the mixture of cocoa meal and cocoa grit to pass, while it holds back the foreign admixtures such as fibers, hairs and the like which may be led away by the outlet tube $k$ as waste, while by the aid of blast sifters known heretofore it was only possible to separate the material into meal and grit. The new apparatus having an inner sieve $i$ allows of a triple sorting viz: meal, grit and waste. The latter consists mainly of woolly hairs or fibers originated from the presscovers (cloths) and it is highly important, that such impurities are removed. The force of the current of air entering the chamber $a$ below the sieve $i$ is regulated by the flaps $d$ in such manner that from the mixture of meal and grit the meal or dust is carried away through the exhauster $g$, while the clean grit is held back by the weight of its particles and leaves the sifter by way of the collecting cone $b$. In arranging the flaps or jalousies outside of the blast sifter the manipulation of the blast sifter is very much facilitated with regard to the regulation of the current of the air. Any known means can be employed to adjust the flaps. Means of this description being generally known are not shown in the drawings. By continuously feeding fresh air from outside through the blast sifter an increase of temperature within the blast sifter is avoided. By properly adjusting the flaps the temperature which is most favorable for separating cocoa powder can be easily maintained constant. The current of air when well saturated with meal or powder is led into a dust or powder collecting device $n$ by the tube $m$. In this device the heavier particles of cocoa are separated from the lighter air by expansion of the latter as is well known and thus the cocoa dust particles are caught below the depositing device. The air which is expelled by the pipe $e$ is led into a well known hose-filter $x$ to clean and deprive the air of any cocoa powder or dust that might have been carried away.

Above the spreading plate $f$ there is arranged a distributing cage $p$ consisting of a perforated mantle and an imperforate bottom, for the purpose of preventing the spreading plate from being charged with the material only on one side by the inlet pipe $o$ which stands at an angle. Within this cage $p$ brushes $q$ and wings $r$ are attached to the upright spindle $s$ of the spreading disk $f$, so that they rotate together with the disk and move the incoming cocoa powder along the wall of the cage and distribute it through its openings. By these means the cocoa powder is well distributed about the whole circumference of the disk and the veil of powder thrown off from the disk is evenly blasted into the chamber $a$ through the meshes of the sieve $i$. Therefore the current of air crossing these streams of powder entering the chamber $a$ will act evenly on the material. The distributing cage $p$ also serves as a safeguard as any foreign bodies, such as nails, stones and the like, will fall on the bottom of the cage $p$ and come to a rest since they cannot be shifted about by the brushes $q$ or wings $r$, the latter do not extend to the bottom. From time to time these foreign bodies can be removed in any convenient manner. The brushes and wings may also serve as agitators for loosening or disintegrating any lumps that may accumulate within the material or to separate smaller particles from the larger by friction.

The operation is as follows: The cocoa cakes which are previously disintegrated or comminuted are fed into a pulverizing machine or mill $v$ by the elevator and on the way they pass a magnetic device $u$ which in usual manner holds metallic impurities back. When well pulverized in the mill $v$ the material is fed on by a conveyer screw $w$ to the inlet $o$ and into the blast sifter. From the pipe $o$ the material drops first into the distributing cage $p$ and from here onto the spreading disk $f$. The latter throws the material readily away and in falling in the shape of a veil the material is caught by the wings $h$ and driven through the meshes of the sieve $i$. The waste material which does not pass the meshes of the sieves, (that is the hairs and fibers) is led away by the pipe $k$. The material which is blasted through the sieve $i$ into the chamber $a$ consisting of grit and meal is separated by the current of air entering from outside. That part of the material, which drops down in the chamber $a$, that is the grit, is collected by the cone $b$ and falls out through its lower spout. The current of air saturated with the cocoa meal or fine powder is driven by the exhauster $g$ into the tube $m$ and from here into the dust collecting device $n$, in which by the expansion of the air the cocoa dust separates from the air and falls down in the collecting vessel.

The hose filter $x$ is arranged above a prolongation of the conveyer $w$ which is arranged below the pulverizing machine $v$. One half of the hose $y$ serves to filter the warm air created by the pulverizing machine $v$, while the other half of the hose serves for filtering the air escaping by the pipe $e$ from the dust depositing device $n$. The dust particles held back by this hose are led away by the outlet $z$.

I claim:

1. An apparatus for separating ground material, comprising a chamber open at its lower end, a sieve mounted within the chamber, means to introduce said material into the sieve, revolving blades within the latter adapted to drive the finer parts of said material through the sieve, an outlet spout at the lower end of the latter, and means to create an upward current of air within the chamber outside the sieve and against the material passed through the sieve.

2. An apparatus for separating ground material, comprising a chamber open at its lower end, a sieve mounted within the chamber, means to press the fine parts of said material through the sieve, means to convey the coarser parts of said material from the interior of the sieve, and means to create an air current upwardly through the bottom of the chamber outside the sieve against material passed through the latter.

3. An apparatus for separating ground material, comprising a chamber open at its lower end, a sieve mounted within the chamber and terminating above the open end of the latter, means to press the fine parts of said material through the sieve, means to convey the coarser parts of said material from the interior of the sieve and means to create an air current upwardly through the bottom of the chamber outside the sieve against material passed through the latter.

4. An apparatus for separating ground material, comprising a chamber open at its lower end, a sieve mounted within the chamber and terminating above the open end of the latter, means to press the fine parts of said material through the sieve, means to convey the coarser parts of said material from the interior of the sieve, means to create an air current upwardly through the bottom of the chamber outside the sieve against material passed through the latter, whereby the lighter parts of the sifted material are entrained by said current, and a collecting cone below the chamber to receive the material not entrained by the current.

5. An apparatus for separating ground material, comprising a chamber open at its lower end, an air exhaust communicating with the upper part of the chamber near the periphery thereof, a sieve mounted within the chamber terminating above the lower end thereof, means to sift the material through the sieve, means to convey waste parts of the material from the interior of the sieve, a collecting cone surrounding the open end of the chamber and provided with air inlets whereby an upwardly directed air current is created by the exhaust within the chamber outside the sieve.

6. An apparatus for separating ground material, comprising a chamber open at its lower end, an air exhaust communicating with the upper part of the chamber near the periphery thereof, a sieve mounted within the chamber terminating above the lower end thereof, means to sift the material through the sieve, means to convey waste parts of the material from the interior of the sieve, a collecting cone surrounding the open end of the chamber and provided with inlets above the open end of the chamber, whereby air is sucked downward into the collecting cone and upward through the chamber outside the sieve.

7. An apparatus for separating ground material, comprising a chamber, a collecting cone surrounding the lower portion of the chamber and communicating therewith through the bottom of the latter, a sieve mounted in the chamber forming an annular passage above the bottom of the latter, means to introduce ground material into the sieve, revolving blades within the latter adapted to drive the fine parts of the material through the sieve, an outlet spout at the lower end of the sieve to carry off the coarse parts of the material therefrom, said collecting cone having air inlets above the bottom of the chamber, and an air exhausting device communicating with the upper part of the chamber to create an air current from the inlets through the bottom of the chamber into the annular passage and against the sifted material for the purpose specified.

EMIL LUDWIG HERMANN BAUERMEISTER.

Witnesses:
F. A. MAX KAEMPFF,
ERNEST H. L. MUMMENHOFF.

---

Copies of this patent may be obtained for five cents each, by addressing the "Commissioner of Patents, Washington, D. C."